(12) United States Patent  
Ferris

(10) Patent No.: US 8,407,284 B2  
(45) Date of Patent: Mar. 26, 2013

(54) SYSTEMS AND METHODS FOR CLOUD DATA DEPLOYMENT BASED ON PREFERENTIAL AND/OR EXISTING SUBSCRIPTION RELATIONSHIPS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 117 days.

(21) Appl. No.: 13/117,331

(22) Filed: May 27, 2011

(65) Prior Publication Data

US 2012/0303814 A1    Nov. 29, 2012

(51) Int. Cl.
*G06F 15/16* (2006.01)
*H04J 3/24* (2006.01)
(52) U.S. Cl. ......... 709/203; 709/220; 370/464; 370/473
(58) Field of Classification Search .................. 709/203, 709/220, 224, 232; 370/464, 473
See application file for complete search history.

(56) References Cited

U.S. PATENT DOCUMENTS

| 8,214,653 B1* | 7/2012 | Marr et al. .................... 713/189 |
| 2011/0137973 A1* | 6/2011 | Wei et al. ...................... 709/202 |
| 2012/0250682 A1* | 10/2012 | Vincent et al. ................ 370/390 |
| 2012/0252405 A1* | 10/2012 | Lortz et al. .................... 455/410 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.
Jeffrey Darcy, "Systems and Methods for Searching a Cloud-Based Distributed Storage Resources Using a Set of Expandable Probes", U.S. Appl. No. 12/893,737, filed Sep. 29, 2010.
Jeffrey Darcy, "Systems and Methods for Monitoring Files in Cloud-Based Networks", U.S. Appl. No. 12/893,388, filed Sep. 29, 2010.
Jeffrey Darcy, "Systems and Methods for Dynamically Replicating Data Objects Within a Storage Network", U.S. Appl. No. 12/872,022, filed Aug. 31, 2010.
James Michael Ferris, "Systems and Methods for Stage Data Migration Between Data Sources and Cloud-Based Storage Network", U.S. Appl. No. 13/037,183, filed Feb. 28, 2011.
James Michael Ferris, "Systems and Methods for De-Populating Cloud Data Storage", U.S. Appl. No. 13/036,977, filed Feb. 28, 2011.
James Michael Ferris, "Systems and Methods for Migrating Data Among Cloud-Based Storage Networks Via a Data Distribution Service", U.S. Appl. No. 13/037,215, filed Feb. 28, 2011.
James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.
James Michael Ferris, "Systems and Methods for Establishing Upload Channels to a Cloud Data Distribution Service", U.S. Appl. No. 13/037,230, filed Feb. 28, 2011.

(Continued)

*Primary Examiner* — Khanh Dinh
(74) *Attorney, Agent, or Firm* — Lowenstein Sandler LLP

(57) ABSTRACT

Embodiments relate to systems and methods for transporting data to a cloud network. In aspects, an administrator of a data payload may wish to transport the data payload from a data distribution service to a candidate cloud provider to leverage cost, security, redundancy, consolidation, or other advantages. The data distribution service can identify candidate cloud providers that are able to host the data payload. Further, the data distribution service can examine any relationships between the administrator and the candidate cloud providers, and, based on the relationships, can present the administrator with respective offers from the candidate cloud providers to host the data payload. The administrator can review the offers, make a selection, and the data payload can be transported to the selected candidate cloud provider for hosting.

20 Claims, 6 Drawing Sheets

OTHER PUBLICATIONS

James Michael Ferris, "Methods and Systems to Automatically Extract and Transport Data Associated with Workload Migrations to Cloud Networks", U.S. Appl. No. 13/116,599, filed May 26, 2011.
James Michael Ferris, "Systems and Methods for Generating Optimized Host Placement of Data Payload in Cloud-Based Storage Network", U.S. Appl. No. 13/118,075, filed May 27, 2011.
James Michael Ferris, "Methods and Systems for Data Compliance Management Associated with Cloud Migration Events", U.S. Appl. No. 13/118,123, filed May 27, 2011.
James Michael Ferris, "Systems and Methods for Determining Consistencies in Staged Replication Data to Improve Data Migration Efficiency in Cloud Based Networks", U.S. Appl. No. 13/117,235, filed May 27, 2011.

* cited by examiner

SYSTEMS AND METHODS FOR CLOUD DATA DEPLOYMENT BASED ON PREFERENTIAL AND/OR EXISTING SUBSCRIPTION RELATIONSHIPS

FIELD

The invention relates generally to systems and methods for data migration to a cloud-based storage network, and more particularly, to platforms and techniques for examining relationships between entities and cloud-based storage networks to prepare data payloads for delivery to the cloud-based storage network.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Existing systems can include a data distribution service configured to host a set of data prior to transporting the set of data to the cloud-based storage. For various reasons, an administrator or other user may wish to consider transporting or migrating the set of data resident in the data distribution service to the cloud-hosted storage. For example, the administrator may have migrated the set of data from an on-premise network to the distribution service, to be transported to the cloud-hosted storage. In addition, the administrator may have an existing relationship with various cloud storage providers that could make possible the transport of the set of data. Instead of manually configuring the transport of the set of data, the administrator may wish to be presented with a set of options for transporting the set of data to one or more of the cloud providers, based on the relationships. Further, the administrator may want to use existing subscriptions or entitlements with the cloud providers to leverage data hosting terms and offers.

Therefore, it may be desirable to provide systems and methods for deploying a set of data to a cloud-based network based on existing subscriptions or relationships. In particular, it may be desirable to provide systems and methods for presenting an administrator with cloud hosting options based on relationships between the administrator and the cloud-based networks.

DESCRIPTION

Figure 1:
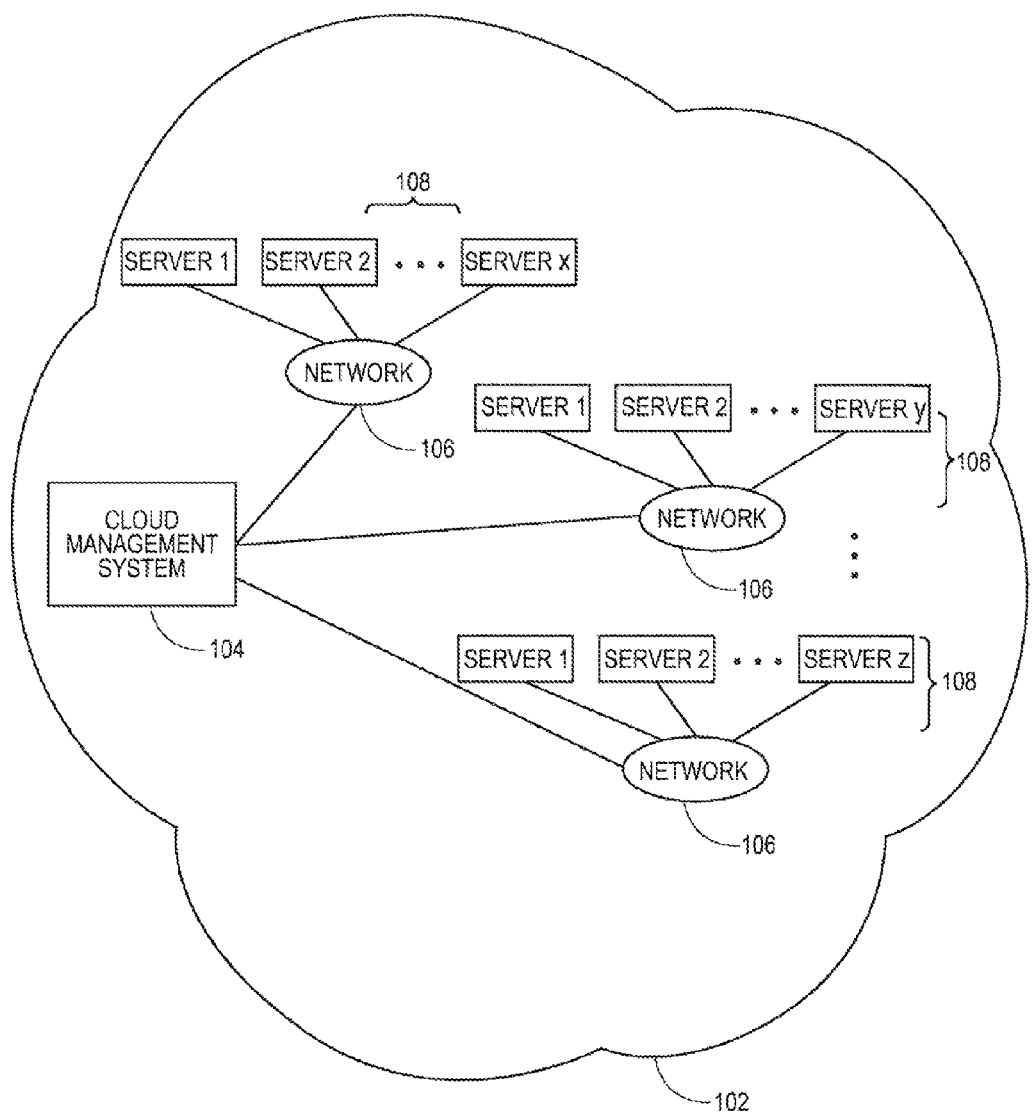
FIG. 1 illustrates an overall cloud system architecture in which various aspects of systems and methods for transporting data based on existing relationships can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
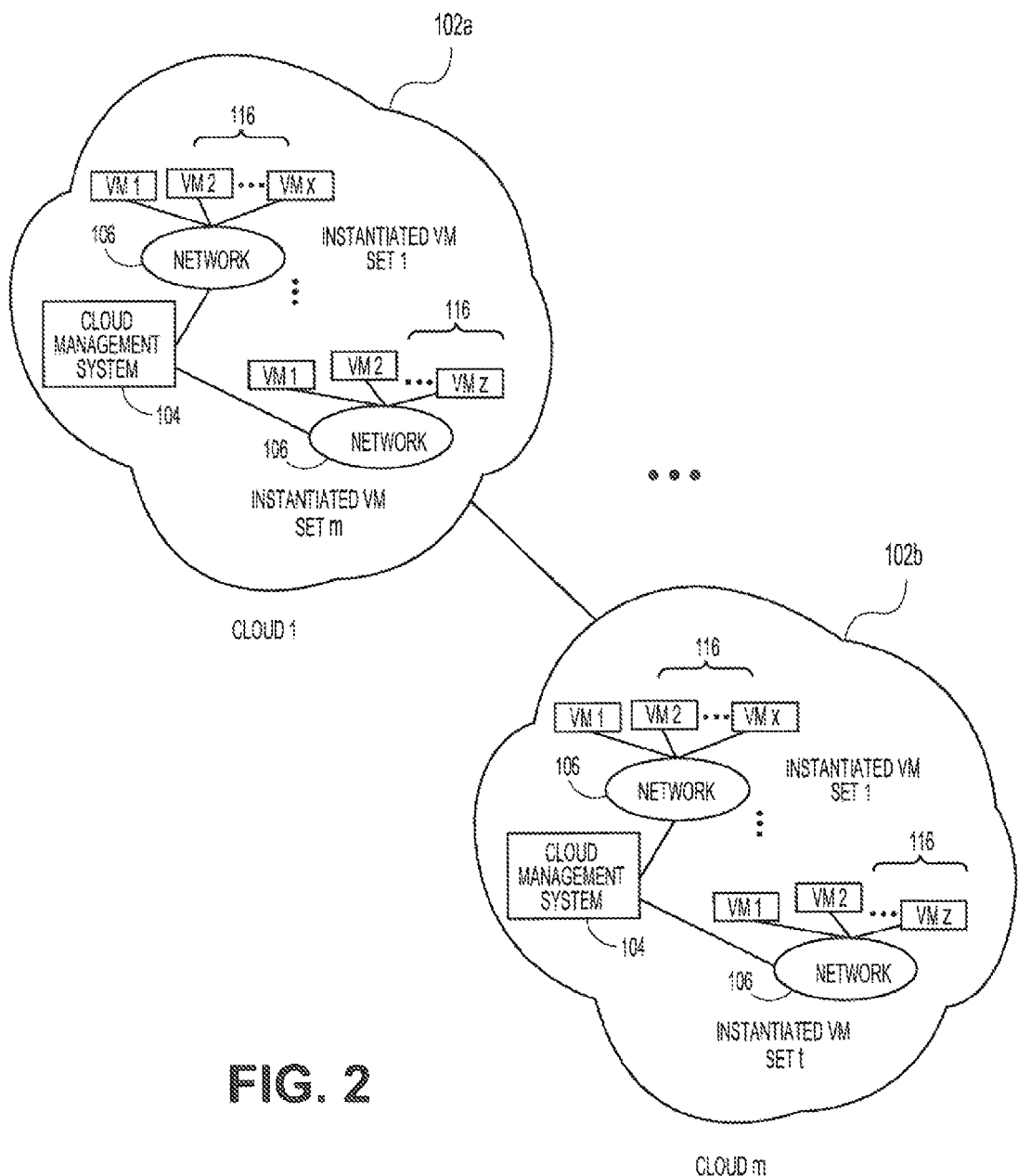
FIG. 2 illustrates an overall cloud system architecture in which various aspects of systems and methods for transporting data based on existing relationships can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more users (including network level users and/or end-users) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 106, such as the Internet or other public or private networks. Those users can for instance access set of instantiated virtual machines 116 via a browser interface, via an application server such as a Java™ server, via an application programming interface (API), and/or other interface or mechanism. Each instantiated virtual machine in the set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

In aspects, the cloud management system 104 and/or other logic or service that manages, configures, and tracks cloud activity can be configured to interact with other sites, platforms, engines, servers, and/or associated services that are configured to organize and manage the transport and delivery of existing data stores from on-premise databases or other sources, and stage that data to data storage resources at, near, co-hosted, or otherwise in geographic proximity to a set of host storage clouds in which that data payload will be placed and stored. In aspects, the cloud distribution data service (which may be referred to as "CDD", "CDD service," "data delivery service," or other references herein) can be located at the network edge to either or both of the premise data sources, and/or the set of host storage clouds. In aspects, this staging or staggering of potentially large-scale or very large-scale data stores can permit the connection between the data source(s), intermediate or staged data stores, and/or the host cloud data stores using dedicated and/or high-bandwidth lines, channels, or connections to permit the efficient and timely porting of that data to a host storage cloud or clouds of the user's choice. In aspects, the data payload or portions thereof can be located, extracted and transmitted as an image or copy of the subject data, with the original cloud-hosted being preserved in the set of host storage clouds. In aspects, the data payload and/or portions thereof can be located, extracted, and transmitted without leaving the original data stored in the set of host storage clouds, such as by deleting that data upon reading-out, or using other techniques.

Figure 3:
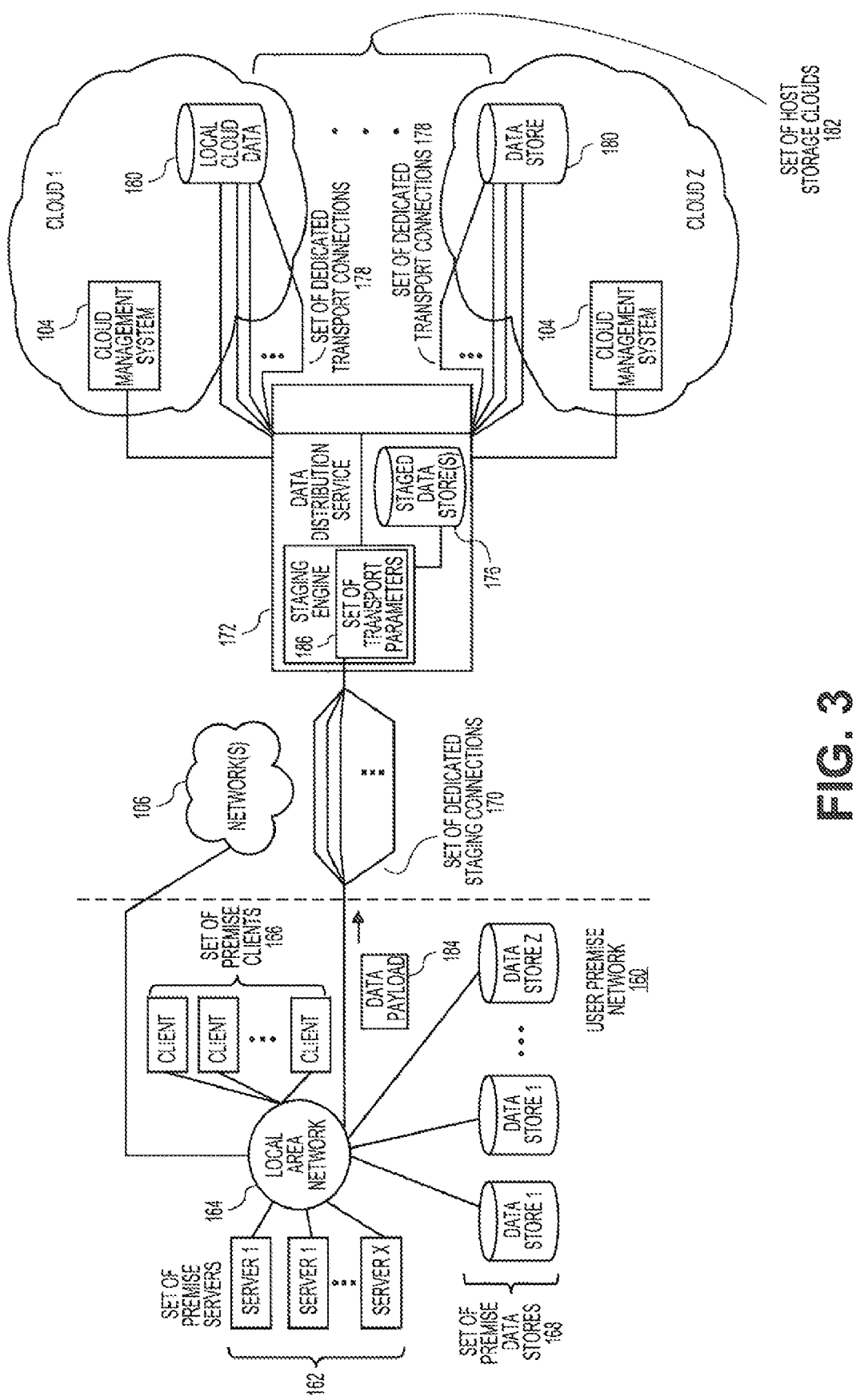
FIG. 3 illustrates a network configuration in which a data distribution service can be established between a premise network and host storage cloud, according to various embodiments.

In those regards, FIG. 3 illustrates a network implementation in which, in various cases, an administrator, owner, operator, and/or other user of a premise network 160 may wish to consider identifying, collecting, and migrating or transporting their databases, data files, and/or other data assets to a set of host storage clouds 182. In aspects and merely illustratively, the premise network 160 can contain or include on-premise, bare-metal, and/or other virtual or physical assets including a set of premise servers 162, a set of premise clients 166, one or more local area networks (LANs) 164 such as an Ethernet™ or Wifi™ network, a virtual private network (VPN), and/or other networks or connection topologies. The premise network 160 can include or interface to one or more networks 106, such as the public Internet and/or other public or private networks.

The premise network 160 can likewise include a set of premise data stores 168, such as one or more databases, data stores, servers, redundant arrays of inexpensive disks (RAID) installations, optical or solid-state storage or devices, and/or other data storage repositories, resources, or assets. In aspects, the set of premise data stores 168 can store different types of data, including, for example, technical, medical, financial, customer, inventory, scientific, and/or other data. The data hosted or stored in the set of premise data stores 168 can comprise significantly or substantially large-scale data, for example data or files comprising terabytes or other amounts of data. For instance, the administrator, owner, operator, and/or other user of a corporation, hospital, educational institution, government body, and/or other entity may collect and maintain a set of data in a set of premise data stores 168 such as local databases, data centers, database files and/or engines, repositories, and/or other data assets, services, and/or other storage sites of resources. In cases, the set of premise data stores 168 can host and store a significant or substantial amount of data, such as terabytes, petabytes, exabytes, yottabytes, and/or other amounts of data. In aspects, the administrator, owner, operator, and/or other user responsible for hosting and/or maintaining that data in the set of premise data stores 168 may, for various reasons, wish to migrate some or all of that data to one or more local cloud data stores 180 in the set of host storage clouds 182, such as to leverage cost, maintenance, capacity, security, and/or other advantages or factors available in the set of host storage clouds 182.

In aspects, it can be the case that if the owner, administrator, and/or other user of the user premise network 160 attempted to transport a significant amount of the data stored in the set of premise data stores 168 via one or more networks 106 such as the Internet in an unmanaged fashion, the comparatively low bandwidth or lack of reliability in the packet-switched public Internet could render the data transfer difficult, impractical, unfeasible, or impossible due to the limitations of those types of channels or connections. The upload of terabytes or other amounts of data over public Internet or similar connections could require days of time or more, and data integrity or reliability issues could also affect the effectiveness of data migration attempted in that manner.

According to aspects, systems and methods for staged data migration between data sources and cloud-based storage networks according to the present teachings can be deployed to assist in reducing, avoiding, or eliminating those and other types of performance degradations and other factors having a potential negative impact on the transport of data from on-premise and/or other sources to the set of host storage clouds 182 and/or other cloud-based storage assets, services, or resources. In implementations of the present teachings, a data distribution service 172 can accordingly be established or deployed as an independent service or access point, available publicly or privately to potential subscribers to the set of host storage clouds 182, to condition, prepare, receive, and stage incoming data payloads or data sets for delivery to an eventual cloud storage host, using enhanced, dedicated, and/or otherwise managed connections to reduce data transport time, to improve transfer reliability and/or security, and/or to provide other factors or benefits. In aspects, the data distribution service 172 can establish or maintain physical points of presence (PoPs) and/or other connections to one or more networks 106, such as the Internet and/or other public or private networks, through which users or potential users can connect to the data distribution service 172 and its associated resources, logic, and services. According to aspects, the data distribution service 172 can host or execute a staging engine 174 that can contain software application, operating system, and/or other logic or resources to manage the transport and delivery of a data payload 184 from the set of premise data stores 168 and/or other sources to a set of host storage clouds 182. In aspects, the data distribution service 172 can be configured to communicate directly or indirectly with the cloud management system 104 of each of the set of host storage clouds 182, for instance via the Internet and/or other public or private networks or connections. In aspects, the data distribution service 172 can also maintain a set of staged data stores 176, such as databases, data stores, servers, and/or other data assets or resources with which to store and stage the data payload 184 for migration into one or more local cloud data stores 180 hosted in the set of host storage clouds 182. In aspects, each cloud in the set of host storage clouds 182 can host one or multiple local cloud data stores 180.

According to implementations of the present teachings, the data distribution service 172 can operate to manage, organize, and/or enhance or optimize the transfer of the data payload 184 from the set of premise data stores 168 and/or other sources by staggering, staging, pre-staging, conditioning, and/or otherwise manipulating and administering the transfer of the data payload 184 to the set of staged data stores 176 via sets of selectable and/or configurable channels or connections. In aspects, those channels or connections can be or include a set of dedicated staging connections 170 that connect the user premise network 160 to the data distribution service 172 and the set of staged data stores 176. In aspects, the set of dedicated staging connections 170 can be or include any one or more of asynchronous transfer mode (ATM) networks or connections, wide area networks (WANs) or connections, metropolitan area networks (MANs) or connections, fiber optical connections such as synchronous optical networking (SONET) or synchronous digital hierarchy (SDH) connections, wireless connections, cable or wireline connections, virtual private networks (VPNs) or connections, and/or other channels or connections. In aspects, the connections in the set of dedicated staging connections 170 can be or include channels or connections can having a relatively high-capacity bandwidth or service level, such as for instance tens of megabytes per second, hundreds of megabytes per second, gigabytes per second, tens of gigabytes per second, hundreds of gigabytes per second, terabytes per second, and/or other data transfer rates or bandwidth ratings or capacities. In aspects, any one or more of the connections or channels in the set of dedicated staging connections 170 can comprise connections which are leased by a user on a temporary, demand-triggered, long-term, and/or other basis. And one or more of the connections or channels in the set of dedicated staging connections 170 can be or include permanent or dedicated channels, line, and/or connections, dynamically routed or configured channels or connections, and/or other channels or connections.

In aspects, the administrator, owner, operator, and/or other user of the user premise network 160 can specify a set of conditions, criteria, and/or other parameters to govern the transport of the data payload 184 during delivery to the data distribution service 172 and/or to the eventual set of host storage clouds 182, which information can be stored or encoded in a set of transport parameters 186, which can be stored in the staging engine 174 and/or other locations or stores. The set of transport parameters 186 can, for instance, specify a total amount of data to be include in the data payload 184 for delivery to the data distribution service 172, as well as a schedule over which or time by which the administrator, owner, operator, and/or other user wishes to conduct and complete the migration of the data payload 184 to the data distribution service 172. The set, of transport parameters 186 can likewise include cost specifications, for instance, in cases where the cost of leasing or using any of the set of dedicated staging connections 170 is selectable or variable. The set of transport parameters 186 can also include further configuration parameters, such as any security or redundancy protocols or standards that the administrator, owner, operator, and/or other user wishes to apply to the transport of the data payload to the data distribution service 172, user access controls to the data payload 184 before or after transport has been initiated or completed. Other parameters, configuration settings, commands, scripts, and/or other criteria, variables, or conditions can be specified or indicated in the set of transport parameters 186.

As a merely illustrative example, the administrator, owner, operator, and/or other user can enter or encode the set of transport parameters 186 to indicate that a data transport event is desired to migrate the data payload 184 from the user premise network 160 under criteria that 1,000 terabytes of data is to be transported by an ending time of 12:00 midnight on a specified data, at an average cost of not more than $0.25 per megabyte and with the data payload 184 encrypted using the Data Encryption Standard (DES) and/or other encryption or security protocol, and with the data payload 184 to be stored in the set of staged data stores 176 of the data distribution service 172 in XML (extensible markup language) or other format. The set of transport parameters 186 can be selected, entered, and/or otherwise transmitted from the user premise network 160 or other site to the data distribution service 172, for instance via a selector tool, Web browser, and/or other application or interface. The set of transport parameters 186 can, in aspects, in whole or part specify the set of dedicated staging connections 170 to be used for delivery of the data payload 184 and/or associated information to the data distribution service 172, for instance via manual selection or input received from the administrator, owner, operator, and/or other user.

In aspects, the data payload 184 and/or associated information can be migrated or transported partly or entirely via the set of dedicated staging connections 170. For instance, the administrator, owner, operator, and/or other user may transmit some of the data payload 184 and/or associated information via the one or more networks, in addition to the set of dedicated staging connections 170. For example, configuration commands, the set of transport parameters 186 or portions of or updates to the set of transport parameters 180, can be transmitted via the one or more networks 106, for instance via the public Internet, since in aspects comparatively higher-bandwidth connections may not be necessary to transmit relatively small amounts of commands and/or data or elements of the data. In cases, the one or more networks 106 can in addition or instead transport at least a portion of the data payload 184, for instance, to transmit supplemental data or attributes whose delivery target time is not immediate or a high priority. Other combinations of the one or more networks 106, the set of dedicated staging connections 170, other networks or connections, and/or combinations thereof can be used.

In aspects, after transport of the data payload 184 to the set of staged data stores 176 of the data distribution service 172 has been completed, the data distribution service 172 can finalize the installation, storage, and/or hosting of the data payload 184 and/or associated information in the one or more local cloud data stores 180 before initiating activities related to further transport of the data payload 184 to the one or more local cloud data stores 180 of one or more of the set of local host storage clouds 182. The data distribution service 172 can store, host, and maintain the data payload 184 in the set of staged data stores 176 for temporary, short-term, and/or longer or other periods, depending on the set of transfer parameters 186 and/or other factors. For instance, the staging engine 174 of the data distribution service 172 can determine that the administrator, owner, operator, and/or other user has specified or requested that the transfer of the data payload 184 into the one or more local cloud data stores 180 of one or more of the set of local host storage clouds 182 be initiated by 9:00 p.m. on a certain date. To satisfy that scheduling criterion, the staging engine 174 can identify the size and/or type of data in the data payload 184, analyze or estimate the bandwidth available in the set of dedicated staging connections 170, and set a target delivery completion time of 11:00 p.m. on the specified delivery date, taking into account the interval of time that will be necessary to transport the data payload 184 over the available bandwidth of the selected channels in the set of dedicated staging connections 170 to complete transfer of the data payload 184 by 11:00 p.m. on that scheduled date. If the transport process proceeds to complete by the calculated completion time of 11:00 p.m. on that date, the data of the data payload 184 and/or any associated information can accordingly reside in the set of staged data stores 176 of the data distribution service 172 for one hour before the staging engine 174 initiates the further or next-stage migration or transport of the data payload 184 to the one or more local cloud data stores 180 of one or more of the set of local host storage clouds 182. The set of staged data stores 176 of the data distribution service 172 can host the data payload 184 and/or associated information for lesser or greater amounts of times, for instance, for periods of minutes, hours, days, weeks, months, and/or other periods or intervals, depending on the set of transfer parameters 186 and/or other factors. For instance, in an illustrative implementation involving payload data 184 including enterprise resource planning (ERP) data related to a chemical or automotive factory, the manufacturing data, materials deliveries and costs, factory repair or maintenance events or schedules, and/or other data may be tracked, stored, and updated on a monthly cycle. In those or other implementations, the administrator, owner, operator, and/or other user may specify that the data payload 184 encapsulating that ERP and/or other data can or should be migrated over a period of 30 days and/or before the next regular update cycle, in which case the data distribution service 172 may determine that the data payload 184 can be extracted to the data distribution service 172 over a period of 30 days, for instance so as to use a comparatively lower amount of bandwidth in the set of dedicated staging connections 170 and thereby incur less connection leasing costs. In cases where the set of staged data stores 176 of the data distribution service 172 stores, hosts, and/or maintains the data payload 184 over significant intervals of time, such as days or weeks of time, and/or other intervals or periods, the data distribution service 172 can also apply or enforce data conditioning or maintenance standards or procedures on the data payload 184 or other information. For example, in cases where the data payload 184 includes medical information, the data distribution service 172 can apply user access controls such as username/password authentication and/or data encryption, for instance to satisfy the requirements of the Health Insurance Portability and Accountability Act (HIPPA), the requirements of the Sarbanes-Oxley Act (SOX), or other regulatory or compliance stipulations or requirements. Other compliance, management, and/or security protocols can be applied to the data payload 184 and/or other information stored in the set of staged data stores 176 of the data distribution service 172, regardless of the duration of time that information is staged in the data distribution service 172. For instance, during the period that the data payload 184 resides or is hosted in the data distribution service 172, the data distribution service 172 can also communicate with the user premise network 160 to interrogate that source network for any incremental or other updates to the data payload 184, and incorporate those updates into the data payload 184 stored in the set of staged data stores 176 of the data distribution service 172. Other data conditioning or processing can be performed on the data payload 184 while hosted or stored in the set of staged data stores 176 of the data distribution service 172.

In aspects, the data distribution service 172 can be installed, configured, and/or located in geographic proximity to the set of host storage clouds 182, the one or more local cloud data stores 180, and/or other network elements or sites. As used or described in this application, in aspects, locations within geographic proximity to each other can be or include locations or sites located within the same city or metropolitan area, and/or within the same general region, such as within a state in the U.S. and/or a multi-state region generally recognized as constituting a cohesive geographic region, such as, merely for example, the New York-New Jersey-Connecticut tri-state area, and/or others. In aspects, locations within geographic proximity to each other can also or instead be or include areas or regions within which direct, continuous, connectable, configurable, leasable, primary, and/or otherwise uninterrupted or unmediated physical or wireless connections are available to establish communications links between two or more network points, sites, and/or entities within a geographic region, section, and/or area. In aspects, network sites, points including physical points of presence (PoPs), and/or other elements can be considered to be within geographic proximity to each other if those sites or points can be connected directly or essentially directly via comparatively high-bandwidth channels or connections, and/or without resorting to connections via the public Internet. For example, network sites, points including physical points of presence (PoPs), and/or other elements can be considered to be within geographic proximity to each other if those sites, points, and/or other elements can be connected directly or essentially directly via one or more wide area networks (WANs), metropolitan area networks (MANs), optical connections such as synchronous optical network (SONET) connections, and/or other comparatively high-bandwidth channels or connections, as will be understood by persons skilled in the art. While network sites, points including physical points of presence (PoPs), and/or other elements can be considered as being within geographic proximity based on various physical, functional, and/or logical factors, in aspects, and purely illustratively, network sites, points including physical points of presence (PoPs), and/or other elements that can be classified or considered as being within geographic proximity can be located within distances of miles, tens of miles, hundreds of miles, and/or lesser or greater distances of each other. Other factors, parameters, criteria, and/or considerations can be used to determine geographic proximity between network sites, points including physical points of presence (PoPs), and/or other elements as described herein.

Upon meeting, reaching, and/or otherwise satisfying the scheduled time, criteria, and/or conditions to initiate the further transfer of the data payload 184 and/or associated information to the set of host storage clouds 182, the data distribution service 172 and/or other logic or service can begin the processing to migrate that data or information to the one or more local cloud data stores 180 of one or more clouds in the set of host storage clouds 182. In aspects, the delivery of the data payload 184 and/or associated information to the set of host storage clouds 182 can be initiated at a scheduled time, such as a time specified in the set of transport parameters 186 and/or other commands or configuration data. In aspects, the delivery of the data payload 184 and/or associated information to the set of host storage clouds 182 can be initiated on an event-triggered basis, such as one hour or one day after completion of the transport of the data payload 184 to the data distribution service 172. In aspects, the delivery of the data payload 184 and/or associated information to the set of host storage clouds 182 can also or instead be initiated by manual selection or command, for instance, by a selection or command inputted by the administrator, owner, operator, and/or other user. Other conditions, commands, schedules, events, and/or criteria can be used to identify a time at which to begin, pause, continue, and/or otherwise deliver the data payload 184 and/or associated information from the data distribution service 172 to the one or more local cloud data stores 180 of one or more clouds in the set of host storage clouds 182.

In aspects, the data payload 184 and/or other information can be transported or transmitted from the data distribution service 172 to the set of host storage clouds 182 via a set of dedicated transport connections 178. In aspects, the set of dedicated transport connections 178 can connect the set of staged data stores 176 directly or indirectly to the one or more local cloud data stores 180 to migrate and install the data payload 184 and/or associated information in the one or more local cloud data stores 180. In aspects, the set of dedicated transport connections 178 can be or include connections or channels of the same general type or types as the set of dedicated staging connections 170, and/or can include additional, separate, and/or different channels or connections. In aspects, the set of staged data stores 176 can be located within geographic proximity or near-geographic proximity, in the senses noted herein, to one or more of the clouds in the set of host storage clouds 182 and/or the constituent elements of those clouds, including the cloud management system(s) 104 and/or one or more local cloud data stores 180. In aspects, the staging engine 174 and/or other logic or service can initiate and manage the transfer of the data payload 184 and/or image thereof stored or hosted in the set of staged data stores 176 to the one or more local cloud data stores 180 via the set of dedicated transport connections 178 on a scheduled, event-triggered, manually-specified, and/or other basis. The migration or transport of the data payload 184 and/or associated data can for instance be programmed to begin at a specified time on a specified date, and/or to begin upon the detection of specified events, such as validation of the data payload 184 and/or associated data using error correction, decryption, and/or other processing or protocols. In aspects, the migration or transport of the data payload 184 and/or associated data can be initiated by receipt of a command, input, and/or other signal from the administrator, owner, operator, and/or other user, for instance, received via a tool, interface, or browser operated by the admin in the user premise network 160 and/or other location or site.

After the transfer of the data payload 184 and/or other associated data has been initiated, the staging engine 174 and/or other logic or service can monitor the transport of that data while in-flight, for instance, to perform data validation of migrated data using for instance check-sum or other processing, encryption/decryption of the data while traversing the set of dedicated transport connections 178, and/or to perform other supervisory or monitoring tasks to ensure the integrity of the data being moved and the migration process. After the successful completion of all data transport, validation, security, and/or other processing required for migration of the data payload 184 and/or related information, the staging engine 174 can detect, confirm, and/or declare the completion of the transfer of the data payload 184 and/or associated information to the set of host storage clouds 182. In aspects, the staging engine 174, one or more cloud management system(s) 104, and/or other logic can store and/or encode the data payload 184 and/or associated information in the one or more local cloud data stores 180 in various formats or configurations, such as, for example, any one or more of a database including relational databases, an object-oriented data object such as an extensible markup language (XML)-based object, a table, tree, linked list, and/or other data object, format, file, and/or configuration. In aspects, the staging engine 174 can also perform any post-transfer activities that may be selected or required to complete the installation and storage of the data payload 184 and/or related information in the set of host storage clouds 182. In aspects, for instance, the staging engine 174 and/or other logic or service can communicate with the user premise network 160 to indicate that the data payload 184 and/or associated information has been safely and/or completely migrated to the data distribution service 172, upon which notification the user premise network 160 can perform other actions, such as to delete and/or archive the data of the data payload 184 from the set of premise data stores 168. Other actions can be taken by or in the user premise network 160.

For instance, upon completion of the data transport process, the staging engine 174 and/or other logic or service can likewise communicate with the cloud management system(s) 104 of one or more of the set of host storage clouds 182 to notify the one or more cloud management system(s) 104 of the installation and presence of the data payload 184 and/or associated data in the one or more local cloud data stores 180 of one or more of the clouds in the set of host storage clouds 182.

In aspects, after the successful or completed transport of the data payload 184 and/or associated information to the set of host storage clouds 182, the staging engine 174, cloud management system(s) 104, and/or other logic or service can for instance register the data payload 184 and/or associated data in the file storage system or systems used by the one or more cloud management system(s) 104 and/or set of host storage clouds 182. In aspects, registration of the data payload 184 and/or associated data in corresponding file storage system or systems maintained or operated by the one or more cloud management system(s) 104 and/or set of host storage clouds 182 can permit, for instance, virtual machines, operating systems, applications, and/or other software, services, and/or users of the set of host storage clouds 182 and/or other clouds or networks to access, read, retrieve, write, modify, and/or otherwise process the data payload 184 and/or associated information directly from or via the set of host storage clouds 182. In aspects, the staging engine 174 and/or other logic or service can at such times or at other times de-activate, release, and/or otherwise terminate some or all of the set of dedicated staging connections 170 and/or set of dedicated transport connections 178, as desired or scheduled.

Figure 4:
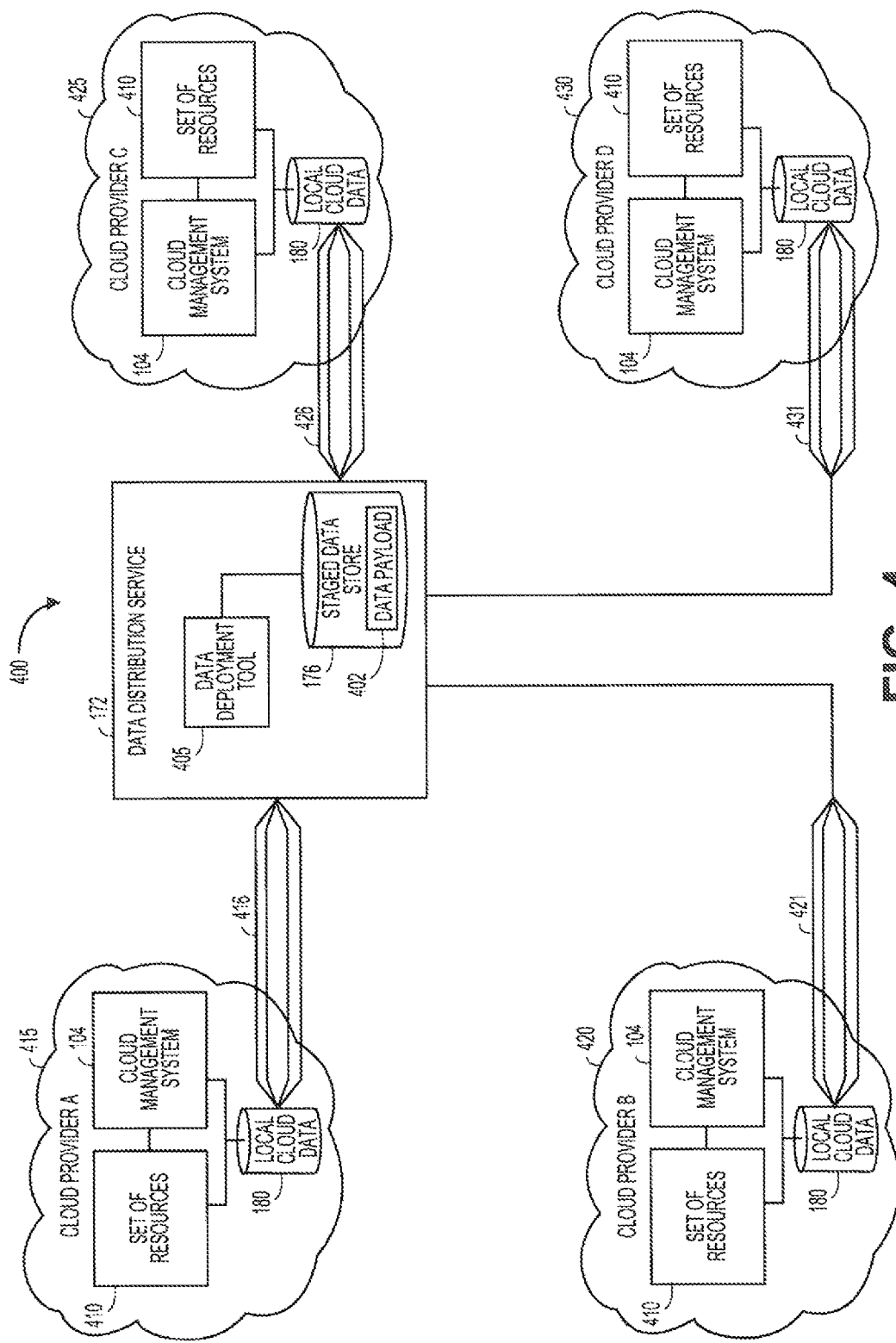
FIG. 4 illustrates a network configuration in which various aspects of systems and methods for transporting data based on existing relationships can be practiced, according to embodiments, according to various embodiments.

FIG. 4 illustrates a network 400 in which, in various cases, an administrator, owner, operator, and/or other user associated with a data payload may wish to consider transporting the data payload and/or other data to a host cloud. For example, as shown in FIG. 4, the administrator can have a data payload 402 stored in the staged data store 176 of the data distribution service 172. The administrator may wish to migrate the data payload 402 to a cloud provider for storage purposes, processing requirements, subscription rate decreases, and/or other reasons. In aspects, the data payload 402 could have been previously transported to the data distribution service 172 from a premise network associated with the administrator, as discussed herein. In further aspects, the data payload 402 could have been previously transported to the data distribution service 172 from a cloud network via a set of dedicated transport connections, or via other configurations.

In aspects, the data distribution service 172 can be connected to one or more candidate cloud providers. For example, as shown in FIG. 4, the data distribution service 172 can be connected to cloud provider A 415, cloud provider B 420, cloud provider C 425, and cloud provider D 430. In aspects, the data distribution service 172 can be connected to the candidate cloud providers via multiple connections such as, for example, a network connection or a respective set of dedicated transport channels 416, 421, 426, and 431. Further, the data distribution service 172 can interface with components of the candidate cloud providers. For example, as shown in FIG. 4, the data distribution service 172 can interface with a cloud management system 104 and a set of resources 410 of each of the cloud providers 415, 420, 425, and 430, and other resources such as the local cloud data 180 of each of the cloud providers 415, 420, 425, and 430. It should be appreciated that multiple data distribution services can be utilized to facilitate the transport of data to any number of associated cloud providers. For example, a first data distribution service can transport the data payload 402 to a second data distribution service, for potential transport to a cloud provider associated with the second data distribution service.

According to aspects, the data distribution service 172 can comprise a data deployment tool 405 that can facilitate the transportation, migration, and otherwise movement of data among components of the network 400. For example, the data deployment tool 405 can direct the transport of the data payload 402 from a premise network of an administrator to the data distribution server 172, and/or from the data distribution service 172 to one or more of the candidate cloud providers. In aspects, an administrator, owner, or other entity associated with the data distribution service 172, data payload 402, any of the candidate cloud providers, or other entities can interface with the data deployment tool 405.

According to aspects, the data deployment tool 405 can receive a request, a set of instructions, or any type of indication from the administrator of the data payload 402, and/or other administrators, to identify candidate cloud providers to which to transport the data payload 402. For example, as shown in FIG. 4, the data deployment tool 405 can determine that any of cloud providers 415, 420, 425, and 430 can comprise resources, such as the respective sets of resources 410, to which to transport the data payload 402. In aspects, the data deployment tool 405 can automatically initiate functionality related to identifying the candidate cloud providers. For example, upon a migration of the data payload 402 to the data distribution service from, for example, an on-premise network, the data deployment tool 405 can initiate functionality related to examining candidate cloud providers. In other aspects, the administrator can specify one or more candidate cloud providers to which to attempt to transport the data payload 402. For example, the administrator can request an attempt to transport the data payload 402 to cloud provider C 425.

The data deployment tool 405 can identify one or more relationships that the administrator of the data payload 402 can have with any of the candidate cloud providers. In aspects, the relationship can be any existing or new subscription, set of entitlements, association, offer, and/or the like, between the administrator or other entity and the candidate cloud provider. For example, the administrator may have already received a subscription offer from one of the candidate cloud providers that details rates for hosting the data payload. For further example, the administrator may already have a subscription with one of the candidate cloud providers in which another data payload of the user is hosted in the candidate cloud provider. It should be appreciated that other types of relationships, subscriptions, entitlement states, offers, associations, and/or the like between the administrator and any of the candidate cloud providers are envisioned.

In aspects, the data deployment tool 405 can determine which of the candidate cloud providers are configured to host the data payload based on any relationships between the administrator and the candidate cloud providers. For example, the administrator can have existing entitlements with one or more of the candidate cloud providers to, such as, instantiate a set of virtual machines, execute software, and/or use other resources or services of the one or more candidate cloud providers. In aspects, the one or more candidate cloud providers that have a relationship with the administrator can be presented to the administrator for a selection. For example, the data deployment tool 405 or other logic can present the determined one or more candidate cloud providers to the administrator in a graphical user interface (GUI), via a data or voice communication, or other data delivery channels. Further, one or more offers associated with hosting the data payload can be presented to the administrator. For example, the offers can detail a price of hosting the data payload, as well as other data such as a term commitment, a data capacity, and other information.

In aspects, the administrator can interrogate, query, or message the determined candidate cloud providers, or any entity associated with the determined candidate cloud providers, to receive further offers or adjustments to the original offers. For example, the administrator can interrogate the candidate cloud providers for an offer that is lower than the original offer. For further example, the administrator can use an existing subscription with one of the candidate cloud providers to leverage a lower cost or rate. In response, the candidate cloud providers can present a modified offer that meets or is closer to the administrator's expectations. It should be appreciated that other negotiating and bargaining techniques are envisioned. In aspects, the data deployment tool 405 or other logic can receive a selection from the administrator for one of the candidate cloud providers that were presented to the administrator. For example, the administrator can select the original offer or any of the modified or updated offers. In other aspects, the administrator can select more than one of the candidate cloud providers, or other various combinations of the candidate cloud providers.

In aspects, the data deployment tool 405 or other logic can initiate and conduct a transport of the data payload 402 to the selected candidate cloud provider. For example, if the administrator selects cloud provider C 425 to host the data payload 402, the data payload 402 can be transported to cloud provider C 425 via the set of dedicated transport channels 426, to be stored on the set of resources 410 or other components or resources. It should be appreciated that other data transport channels are envisioned. In aspects, the data deployment tool 405 can encrypt and/or decrypt the data payload during any transport or migration, and/or establish secure communication channels among any entities associated with the data distribution service 172. In aspects, the data payload 405 can be split and transported to multiple candidate cloud providers, as specified by the administrator or another entity.

As an example, suppose an administrator of a financial institution desires to transport a data payload from a data distribution service to a cloud provider associated with the data distribution service, wherein the data payload comprises customer data such as account information. The administrator can desire to inquire about different hosting offers from various cloud providers. Further, merely for example, the administrator can have an existing relationship with the various cloud providers such as, for example, an existing data hosting arrangement. Logic such as the data deployment tool 405 can query the various cloud providers to inquire about the ability of the various cloud providers to host the data payload. If any of the cloud providers can host the data payload, the cloud providers can provide a subscription offer to the administrator. For example, the cloud providers can offer to host the data payload for a specified yearly rate. In aspects, the offer can be similar to, based on, or otherwise related to the existing relationship(s) that the administrator as with the cloud providers.

In response to receiving the offers, the administrator can query the offering cloud providers in an attempt to modify the offer. For example, the administrator can desire to reduce a specified yearly rate, or can offer to sign a two year subscription in exchange for a lower yearly rate, or other modification requests. For further example, the administrator can attempt to use the existing relationship as leverage for a more favorable offer from the associated cloud providers. Once a negotiation or offer modification is complete, the administrator can select a subscription plan. Further, the data can be transported to the appropriate cloud provider for hosting, according to the selected subscription plan.

Figure 5:
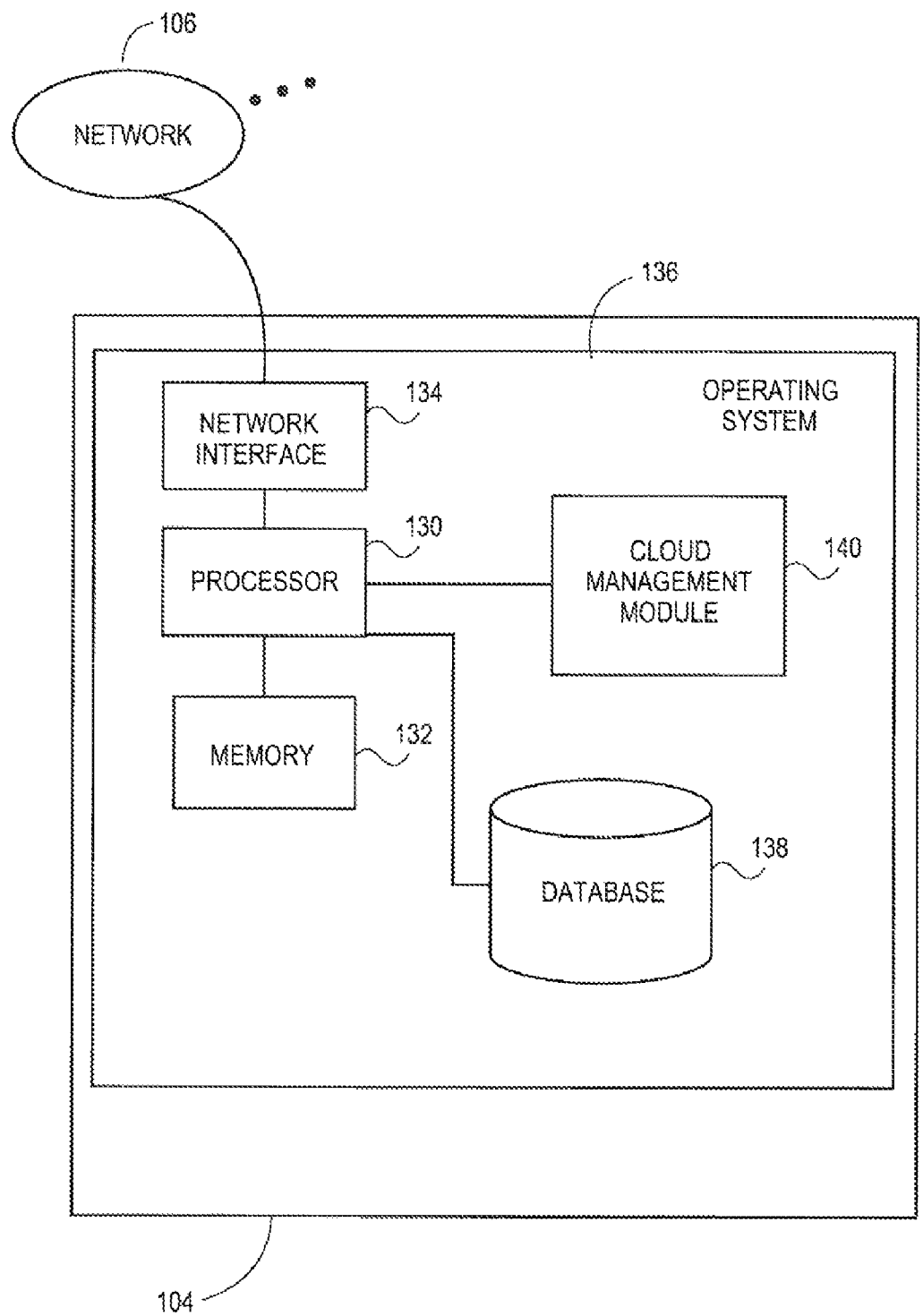
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, and/or other entities, services, or resources via one or more networks 106 and/or other connections, according to aspects. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a database 138, such as a database stored on a local hard drive, and a cloud management module 140, to execute control logic and control the operation of virtual machines and other resources in one or more clouds 102, a set of target clouds, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the data deployment tool 405 of the data distribution service 172 or other staging area, and/or other interfaces, applications, services, and/or logic. Other configurations of the cloud management system 104, associated network connections, and other hardware, software, and service resources are possible. It may be noted that in embodiments, the data distribution service 172 and/or components thereof such as the data deployment tool 405, and/or other hardware machines, platforms, or engines can comprise the same or similar resources as cloud management system 104, or can be configured with different hardware and software resources.

Figure 6:
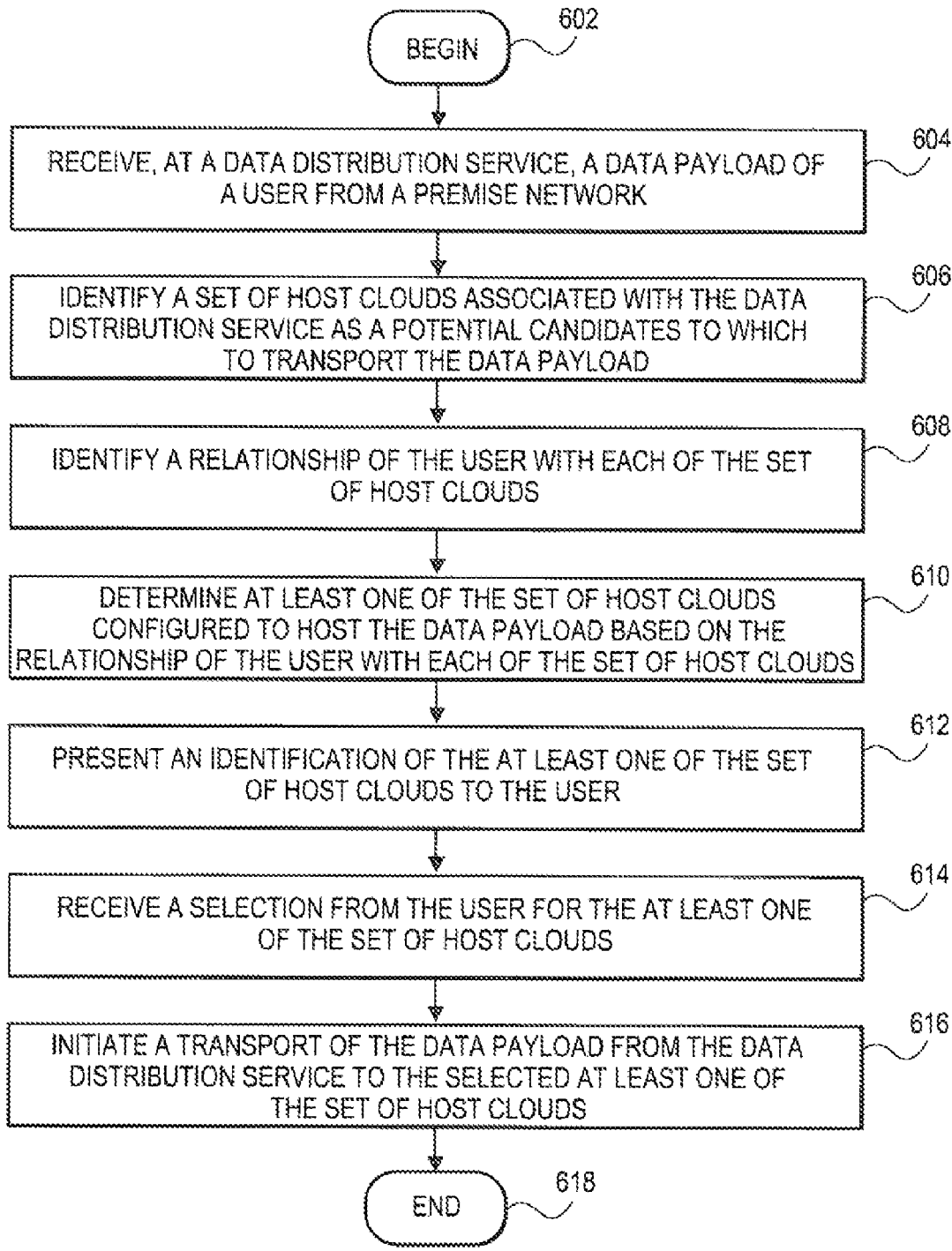
FIG. 6 illustrates a flowchart for configuring a transport of data to a cloud-based network based on existing relationships, according to various embodiments.

FIG. 6 illustrates a flowchart of overall processing that can be used to identify candidate host clouds for a data payload, according to various aspects of the present teachings. In 602, processing can begin. In 604, a data payload of a user can be received at a data distribution service from a premise network. In embodiments, the data payload can be received from the premise network via any type of network connection. In 606, a set of host clouds associated with the data distribution service can be identified as potential candidates to which to transport the data payload. In embodiments, the set of host clouds can be at: near, co-hosted, or otherwise in geographic proximity to the data distribution service, or otherwise connected to the data distribution service via a network.

In 608, a relationship of the user with each of the set of host clouds can be identified. In embodiments, the relationship can be pre-existing and/or can be related to a set of established entitlements, subscriptions, and/or the like. In 610, at least one of the set of host clouds configured to host the data payload can be determined based on the relationship of the user with the at least one of the set of host clouds. In embodiments, the user can have an existing subscription with the at least one of the set of host clouds, or other relationships.

In 612, an identification the at least one of the set of host clouds can be presented to the user. In embodiments, the identification of the at least one of the set of host clouds can be presented via, for example, a graphical user interface, or any other type of data communication. In further embodiments, subscription offers or information related to the at least one of the set of host clouds can also be presented to the user. In 614, a selection from the user for the at least one of the set of host clouds can be received. In embodiments, the user can select one or many of the set of host clouds that are configured to host the data payload. In further embodiments, the user can interrogate the set of host clouds for offers or adjustments related to hosting the data payload. In 616, a transport of the data payload from the data distribution service to the selected host cloud can be initiated. In embodiments, the data can be transferred via a set of dedicated transport channels, or via other connections. In 618, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
   identifying a data payload stored in a data distribution service, wherein a user is associated with the data payload;
   identifying a set of candidate host clouds associated with the data distribution service;
   examining, by a processor, a relationship of the user with each of the set of candidate host clouds;
   presenting, to the user based on the examination, at least one of the set of candidate host clouds configured to host the data payload; and
   initiating a transport of the data payload in the data distribution service to resources associated with the at least one of the set of candidate host clouds.

2. The method of claim 1, further comprising receiving the data payload from a premise network associated with the user.

3. The method of claim 1, further comprising:
   receiving, from the user, a selection of the at least one of the set of candidate host clouds.

4. The method of claim 1, wherein the set of candidate host clouds is connected to the data distribution service via a set of dedicated transport channel connections.

5. The method of claim 1, wherein presenting the at least one of the set of candidate host clouds comprises providing an indication of at least one offer to host the data payload.

6. The method of claim 5, further comprising:
   interrogating the at least one of the set of candidate host clouds for a modification to the at least one offer; and
   receiving, from the at least one of the set of candidate host clouds, a modified offer to host the data payload.

7. The method of claim 1, wherein the relationship of the user with each of the set of candidate host clouds comprises an established entitlement or subscription with each of the set of candidate host clouds.

8. The method of claim 1, wherein the relationship of the user with each of the set of candidate host clouds comprises a previous offer received from each of the set of candidate host clouds.

9. The method of claim 1, further comprising:
   transporting the data payload to the resources associated with the at least one of the set of candidate host clouds that was selected via a set of dedicated transport channels.

10. The method of claim 1, wherein the at least one of the set of candidate host clouds configured to host the data payload is presented to the user via a graphical user interface (GUI).

11. A system, comprising:
    an interface to a data distribution service; and
    a processor, communicating with the data distribution service via the interface, the processor to:
    identify a data payload stored in the data distribution service, wherein a user is associated with the data payload;
    identify a set of candidate host clouds associated with the data distribution service;
    examine a relationship of the user with each of the set of candidate host clouds;
    present, to the user based on the examination, at least one of the set of candidate host clouds configured to host the data payload; and
    initiate a transport of the data payload in the data distribution service to resources associated with the at least one of the set of candidate host clouds.

12. The system of claim 11, wherein the processor is further to receive the data payload from a premise network associated with the user.

13. The system of claim 11, wherein the processor is further to:
    receive, from the user, a selection of the at least one of the set of candidate host clouds.

14. The system of claim 11, wherein the set of candidate host clouds is connected to the data distribution service via a set of dedicated transport channel connections.

15. The system of claim 11, wherein to present the at least one of the set of candidate host clouds, the processor is to provide an indication of at least one offer to host the data payload.

16. The system of claim 15, wherein the processor is further to:
    interrogate the at least one of the set of candidate host clouds for a modification to the at least one offer; and
    receive, from the at least one of the set of candidate host clouds, a modified offer to host the data payload.

17. The system of claim 11, wherein the relationship of the user with each of the set of candidate host clouds comprises an established entitlement or subscription with each of the set of candidate host clouds.

18. The system of claim 11, wherein the relationship of the user with each of the set of candidate host clouds comprises a previous offer received from each of the set of candidate host clouds.

19. The system of claim 13, wherein the processor is further to:
    transport the data payload to the resources associated with the at least one of the set of candidate host clouds that was selected via a set of dedicated transport channels.

20. The system of claim 11, wherein the at least one of the set of candidate host clouds configured to host the data payload is presented to the user via a graphical user interface (GUI).

* * * * *